United States Patent
Scherwath et al.

(10) Patent No.: US 12,072,238 B2
(45) Date of Patent: Aug. 27, 2024

(54) PHOTOCONDUCTOR READOUT CIRCUIT

(71) Applicant: TRINAMIX GMBH, Ludwigshafen am Rhein (DE)

(72) Inventors: Bernd Scherwath, Ludwigshafen (DE); Peter Fejes, Ludwigshafen (DE); Celal Mohan Oeguen, Ludwigshafen (DE); Robert Gust, Ludwigshafen (DE); Robert Send, Karlsruhe (DE); Stefan Hoos, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 315 days.

(21) Appl. No.: 17/754,468

(22) PCT Filed: Oct. 8, 2020

(86) PCT No.: PCT/EP2020/078227
§ 371 (c)(1),
(2) Date: Apr. 1, 2022

(87) PCT Pub. No.: WO2021/069554
PCT Pub. Date: Apr. 15, 2021

(65) Prior Publication Data
US 2022/0326075 A1    Oct. 13, 2022

(30) Foreign Application Priority Data
Oct. 9, 2019  (EP) ..................... 19202131

(51) Int. Cl.
*G01K 7/00* (2006.01)
*G01J 1/44* (2006.01)
*G01K 7/16* (2006.01)

(52) U.S. Cl.
CPC .................. *G01J 1/44* (2013.01); *G01K 7/16* (2013.01); *G01J 2001/4446* (2013.01)

(58) Field of Classification Search
CPC ......... G01J 1/44; G01J 2001/4446; G01J 1/46
See application file for complete search history.

(56) References Cited

U.S. PATENT DOCUMENTS 5,575,284 A    11/1996    Athan et al.
6,465,786 B1 *  10/2002   Rhodes ............. H01L 27/14609
                                               250/338.4

FOREIGN PATENT DOCUMENTS

CN    208077480 U    11/2018
WO    2012110924 A1   8/2012
(Continued)

OTHER PUBLICATIONS

English translation CN20877480U. (Year: 2018).*
(Continued)

*Primary Examiner* — Dani Fox
(74) *Attorney, Agent, or Firm* — Armstrong Teasdale LLP

(57) ABSTRACT

Disclosed herein is a device including
at least one photoconductor configured for exhibiting an electrical resistance Rphoto dependent on an illumination of a light-sensitive region of the photoconductor; and
at least one photoconductor readout circuit, where the photoconductor readout circuit is configured for determining the electrical resistance Rphoto of the photoconductor, where the photoconductor readout circuit includes at least one bias voltage source configured for applying at least one modulated bias voltage to the photoconductor.

12 Claims, 6 Drawing Sheets

(56) References Cited

FOREIGN PATENT DOCUMENTS

WO      2014097181 A1    6/2014
WO      2016120392 A1    8/2016

OTHER PUBLICATIONS

Anonymous, "555 timer IC—Wikipedia", Oct. 2, 2019 (Oct. 2, 2019), URL:https://en.wikipedia.org/w/index.php?title=555_timer_IC&oldid=919149415. [retrieved on Mar. 29, 2022].
International Search Report and Written Opinion for corresponding PCT/EP2020/078227 mailed Feb. 16, 2021; 10 pages.

* cited by examiner

PHOTOCONDUCTOR READOUT CIRCUIT

CROSS-REFERENCE TO RELATED APPLICATIONS

This application is a U.S. National Phase Application of International Patent Application No. PCT/EP2020/078227, filed Oct. 8, 2020, which claims priority to European Patent Application No. 19202131.9, filed Oct. 9, 2019, each of which is hereby incorporated by reference herein.

DESCRIPTION

Field of the Invention

The invention relates to a photoconductor readout circuit, a detector and use of a photoconductor readout circuit for readout of photoconductors. Specifically, the photoconductor readout circuit may be used to determine a measurable voltage response of photoconductors such as of lead sulfide photoconductors sensors.

Prior Art

Photoconductors such as lead sulfide photoconductors require a resistance measurement for readout. This may require strong bias voltages and circuits fit for this voltage. The measurement is usually done in comparison of other resistors. Usually resistors or photoconductors are measured in Wheatstone-bridge like circuits. For example, voltage divider circuits are known for read out photoconductors. Usually a voltage amplifier together with a voltage divider is used, see for example https://www.hamamatsu.com/resources/pdf/ssd/e06_handbook_compound_semiconductor.pdf, to measure the signal from a photoconductor.

However, for this known readout circuits resistance may drift, probably due to electrochemical processes, as a response to unmodulated bias voltages. In combination with broad-band infrared light sources, modulation of the light source is an issue and is usually slow, leading to a high f-noise due to the longer measurement times. A need exists for a cheaper and more reliable read-out electronics which allows to adjust the measurement frequency independent of the light modulation frequency.

CN 208 077 480 describes a LED scintillation frequency control ware for 555 integrated circuit teaching belonging to the digital electronic technology field. The oscillation circuit that 555 integrated circuit constitutes is a focus and difficult point among the digital electronic technology course teaching, the utility model discloses a 555 integrated circuit design square wave oscillation circuit, its "Frequency" is controlled by environment illumination intensity, and then realizes the function of illumination intensity control LED flicker frequency. Applied to this utility model the 555 integrated circuits of digital electronic technology course experiment and impart knowledge to students, can transfer the interest that the student participated in the experiment teaching, improve the teaching effect. The "555 timer IC" is described in "555 timer IC—Wikipedia", en.wikipedia.org/w/index.php?title=555 timer IC&oldid=919149415.

Problem Addressed by the Invention

Therefore, a problem addressed by the present invention is that of specifying a photoconductor readout circuit and a detector which at least substantially avoid the disadvantages of known circuits of this type. In particular, an improved, in particular more reliable, and cost-effective readout of a photoconductor would be desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a device is disclosed. The device comprises
- at least one photoconductor configured for exhibiting an electrical resistance $R_{photo}$ dependent on an illumination of a light-sensitive region of the photoconductor;
- at least one photoconductor readout circuit, wherein the photoconductor readout circuit is configured for determining the electrical resistance $R_{photo}$ of the photoconductor, wherein the photoconductor readout circuit comprises at least one bias voltage source configured for applying at least one modulated bias voltage to the photoconductor.

The term "photoconductor", also denoted as photoresistor, as used herein is a broad term and is to be given its ordinary and customary meaning to a person of ordinary skill in the art and is not to be limited to a special or customized meaning. The term specifically may refer, without limitation, to a light sensitive element capable of exhibiting a specific electrical resistance $R_{photo}$ dependent on an illumination of the light-sensitive region the photoconductor. Specifically, the electrical resistance is dependent on the illumination of a material of the photoconductor. As will be outlined in detail below, the photoconductor may comprise a light-sensitive region comprising a "photoconductive material". A photoconductor can, for example, be applied in light-sensitive detector circuits.

The term "illumination" as used herein is a broad term and is to be given its ordinary and customary meaning to a person of ordinary skill in the art and is not to be limited to a special or customized meaning. The term specifically may refer, without limitation, to electromagnetic radiation in one or more of the visible spectral range, the ultraviolet spectral range and the infrared spectral range. Therein, in partial accordance with standard ISO-21348, the term visible spectral range generally refers to a spectral range of 380 nm to 760 nm. The term infrared (IR) spectral range generally refers to electromagnetic radiation in the range of 760 nm to 1000 µm, wherein the range of 760 nm to 1.4 µm is usually denominated as the near infrared (NIR) spectral range, and the range from 15 µm to 1000 µm as the far infrared (FIR) spectral range. The term "ultraviolet spectral range" generally refers to electromagnetic radiation in the range of 1 nm to 380 nm, preferably in the range of 100 nm to 380 nm. In the following, the term "illumination" is also denoted as "light". Preferably, illumination as used within the present invention is visible light, i.e. light in the visible spectral range, and/or infrared light, i.e. light in the infrared spectral range.

As used herein, the term "light-sensitive region of the photoconductor" generally refers to an area of the photoconductor being sensitive to an illumination, e.g. by an incident light beam. For example, the light-sensitive region may be a two-dimensional or three-dimensional region which preferably, but not necessarily, is continuous and can form a continuous region. The photoconductor can have one or else a plurality of such light-sensitive regions. As used herein, the term "to exhibit an electrical resistance $R_{photo}$ dependent on an illumination" generally refers to that the electrical resistance of the photoconductor is adjusted and/or changed and/or varied dependent, on the illumination, in particular an intensity of the illumination, of the light-sensitive region. In particular, in response to the illumination, the electrical resistance is adjusted and/or changed and/or varied. When the photoconductor is illuminated the photoconductor may exhibit a decrease in electrical resistance. The photoconductor may lower its resistivity when illuminated. Specifically, the electrical resistance of the photoconductor may decrease with increasing incident light intensity. The change between dark resistance and bright resistance is the quantity to be measured or to be read out. As used herein, the term "dark resistance" generally refers to an electrical resistance of the photoconductor in unlit state, i.e. without illumination. As further used herein, the term "bright resistance" refers to an electrical resistance of the photoconductor under illumination. For measuring and/or read out generally voltage divider circuits are known which have a non-linear behavior. A linear change in the resistance of the photoconductor leads to a non-linear change in the voltage output. The present invention, as will be outlined in more detail below, proposes circuit features having a linear behavior.

The photoconductor may comprise at least one photoconductive material. Since an electrical resistance is defined as the reciprocal value of the electrical conductivity, alternatively, the term "photoresistive material" may also be used to denominate the same kind of material. The light-sensitive region may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs, organic semiconductors. However, other materials may be feasible. Further possible photoconductive materials are described in WO 2016/120392 A1, for example. For example, the photoconductor may be a photoconductor commercially available under the brand name Hertzstueck™ from trinamiX GmbH, D-67056 Ludwigshafen am Rhein, Germany.

For example, the light-sensitive region may be illuminated by at least one illumination source. The illumination source can for example be or comprise an ambient light source and/or may be or may comprise an artificial illumination source. By way of example, the illumination source may comprise at least one infrared emitter and/or at least one emitter for visible light and/or at least one emitter for ultraviolet light. By way of example, the illumination source may comprise at least one light emitting diode and/or at least one laser diode. The illumination source can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm.

The illumination source may comprise at least one non-continuous light source. Alternatively, the illumination source may comprise at least one continuous light source. The light source may be an arbitrary light source having at least one radiating wavelength having an overlap to the sensitive wavelength of the photosensitive detector. For example, the light source may be configured for generating a Planckian radiation. For example, the light source may comprise at least one light emitting diode (LED) and/or at least one Laser source. For example, the light source may be configured for generating illumination by an exotherm reaction, like an oxidation of liquid or solid-material or Gas. For example, the light source may be configured for generating illumination out of fluorescent effects. The illumination source may be configured for generating at least one modulated light beam. Alternatively, the light beam generated by the illumination source may be non-modulated and/or may be modulated by further optical means. The illumination source may comprise at least one optical chopper device configured for modulating a light beam from the continuous light source. The optical chopper device may be configured for periodically interrupting the light beam from the continuous light source. For example, the optical chopper device may be or may comprise at least one variable frequency rotating disc chopper and/or at least one fixed frequency tuning fork chopper and/or at least one optical shutter. The proposed device may measure and/or determine the resistance of the photoconductor independent of light modulation frequency. Thus, the proposed device allows the measurement of the photoconductor resistance for illumination sources without modulated light intensities.

The term "photoconductor readout circuit" as used herein is a broad term and is to be given its ordinary and customary meaning to a person of ordinary skill in the art and is not to be limited to a special or customized meaning. The term specifically may refer, without limitation, to an electronic circuit configured for readout of at least one photoconductor and/or a plurality of photoconductors.

The photoconductor readout circuit may comprise:
at least one measurement voltage divider circuit, wherein the photoconductor is in series with at least one capacitor, wherein the capacitor is chargeable by the photoconductor;
at least one comparator circuit comprising at least one reference voltage divider circuit and at least one comparator, wherein the comparator comprises at least one input, wherein a first input is electrically connected with an output of the measurement voltage divider circuit, wherein the comparator is configured for changing between two output states when input voltage at the first input is identical with at least one reference voltage;
at least one output terminal, wherein the electrical resistance $R_{photo}$ of the photoconductor is determinable from a charge-discharge-frequency at the output terminal.

The term "voltage divider circuit", also denoted as potential divider, as used herein is a broad term and is to be given its ordinary and customary meaning to a person of ordinary skill in the art and is not to be limited to a special or customized meaning. The term specifically may refer, without limitation, to an electronic circuit which is configured for generating an output voltage signal which is a fraction of an input voltage signal of the voltage divider circuit. As used herein, the term "measurement voltage divider circuit" as used herein is a broad term and is to be given its ordinary and customary meaning to a person of ordinary skill in the art and is not to be limited to a special or customized meaning. The term specifically may refer, without limitation, to refers to a voltage divider circuit comprising the at least one photoconductor to be measured. As used herein, the term "reference voltage divider circuit" as used herein is a broad term and is to be given its ordinary and customary meaning to a person of ordinary skill in the art and is not to be limited to a special or customized meaning. The term specifically may refer, without limitation, to a voltage divider circuit comprising at least two reference resistors each having a known such as a predefined or a predetermined resistance. The reference voltage divider circuit may comprise at least two reference resistors each having a predefined or predetermined resistance. The term "reference resistor" as used herein is a broad term and is to be given its ordinary and customary meaning to a person of ordinary skill in the art and is not to be limited to a special or customized meaning. The term specifically may refer, without limitation, to a resistor having a known electrical resistance $R_i$, wherein i is a natural number and denotes a name of the resistor.

The term "capacitor" as used herein is a broad term and is to be given its ordinary and customary meaning to a person of ordinary skill in the art and is not to be limited to a special or customized meaning. The term specifically may refer, without limitation, to at least one element configured for collecting and/or storing electrical energy, in particular electrons originating from the photoconductor. The capacitor is arranged in series with the photoconductor. The capacitor is chargeable by the photoconductor. In particular at least one output of the photoconductor may be electrically connected with at least one input of the capacitor. The smaller the electrical resistance $R_{photo}$ the faster the capacitor C will be charged. In a common voltage divider, the maximum dynamic range of the output signal is achieved when the resistance values of both resistors are the same. Photoconductors may have generally resistance values >100 kΩ. Large resistor values may lead to a high thermal noise in the circuit. The low-noise, high temperature stability resistors based on metal foil technology can commonly be found for lower resistance values and thus are not applicable as voltage dividers. In the circuit according to the present invention, the resistor of the measurement voltage divider is replaced with a capacitor.

As used herein, the term "comparator circuit" is a broad term and is to be given its ordinary and customary meaning to a person of ordinary skill in the art and is not to be limited to a special or customized meaning. The term specifically may refer, without limitation, to an electronic circuit configured for comparing at least one input voltage, specifically at least one voltage to be measured, with at least one reference voltage, specifically at least one pre-known or predetermined reference voltage. The comparator circuit may be configured for outputting an output signal indicating the result of the comparison. The comparator circuit may be embodied as inverting Schmitt trigger. The inverting Schmitt trigger may comprise a comparator and a positive feedback to the noninverting input of the comparator implemented by a voltage divider circuit, in the present case the reference voltage divider.

The comparator circuit comprises at least one comparator. As used herein, the term "comparator" is a broad term and is to be given its ordinary and customary meaning to a person of ordinary skill in the art and is not to be limited to a special or customized meaning. The term specifically may refer, without limitation, to an electronic element configured for comparing the at least one input voltage with at least one reference voltage and for generating an output signal indicating the result of the comparison. The comparator, specifically the electronic comparator element, may be or may comprise one or more of: at least one operational amplifier; at least one Schmitt trigger; at least one logic elements based on emitter coupled logic (ECL); at least one transistor-transistor logic (TTL) such as at least one advanced Schottky (ASTTL), at least one FAST-Schottky, at least one High Speed CMOS and at least one CMOS; and at least one Tri-state logic comparator. For example, the comparator may be or may comprise at least one operational amplifier and/or at least one further electronic element configured for performing the named operations. As used herein, the term "comparing" is a broad term and is to be given its ordinary and customary meaning to a person of ordinary skill in the art and is not to be limited to a special or customized meaning. The term specifically may refer, without limitation, to performing at least one mathematical operation such as dividing or subtracting the input voltage with the reference voltage.

For the resistors in the reference voltage divider circuit, only the ratio of the resistors may be important. The ratio of the reference resistors in the reference voltage divider circuit may remain the same as long as the resistance values of both resistors are changed with the same factor, which allows to use resistors with a long range of resistance values.

The comparator may be driven by a supply voltage. For example, two identical direct current (DC) voltages such in a range from ±0.001V to ±5000V, preferably ±1V to ±500V, more preferably ±2V to ±50V may be applied to supply inputs of the comparator. The comparator may be driven with single supply voltage, wherein the supply voltage may be from ±0.001 V to ±5000 V. Preferably, the supply voltage may be from ±0.1 V to ±500 V and most preferably the supply voltage may be from ±1 V to ±50 V. Alternatively, the comparator may be driven a dual supply voltage, where can be between ±0.001 V and ±5000 V. Preferably, the supply voltage may be from ±0.1 V to ±500 V and most preferably the supply voltage may be from ±1 V to ±50 V. The comparator dual supply voltage can be symmetrical or asymmetrical.

The comparator comprises at least one input. For example, the comparator comprises at least two inputs such as two input terminals. The comparator may comprise the at least first input and at least second input. Specifically, the comparator may have an inverting input (−) and a non inverting input (+). The output of the reference voltage divider may be connected to the non-inverting input of the comparator while the output of the measurement voltage divider may be connected to the inverting input. Thus, the first input is electrically connected with the output of the measurement voltage divider circuit and the second input is electrically connected with the output of the reference voltage divider circuit. The first input may be the inverted input and the second input may be the non-inverted input. The reference voltage divider may be configured for providing a positive feedback to the comparator. In particular, the reference voltage divider may be arranged such that part of the output voltage of the comparator appears at the non-inverting input. In other embodiments, the comparator may comprise only one input. In this case the comparator may comprise an internal comparison voltage.

The output signal, also denoted output voltage, of the comparator may depend on the result of the comparison of the input voltage with the reference voltage. The voltage at the first input is denoted herein as input voltage, specifically as measurement voltage signal $V_{meas}$. The voltage at the second input or the internal reference voltage of the said comparator, for example in case of Schmitt trigger, is denoted as reference voltage $V_{ref}$. The comparator is configured for changing between two output states when input voltage at the first input is identical with the reference voltage.

The output signal may be a digital signal, in particular a binary digital output having two states denoted as output states. The output state $V_{out}$ may depend on which of the input voltage or the reference voltage is larger:

$$V_{out} = \begin{cases} \text{high if } V_{ref} > V_{meas} \\ \text{low if } V_{ref} < V_{meas} \end{cases}.$$

When the measurement voltage is less than the reference voltage the output voltage will be "high". The "high" output state may be positive, in particular equal to a positive saturation voltage. When the measurement voltage becomes equal to the reference voltage, i.e. by further charging of the capacitor, the comparator changes the output state to "low", which is in particular equal to a negative saturation voltage. In this case of switching from high to low output state, a negative voltage may appear at the non-inverting input as a result of the negative saturation voltage at the output of the comparator. Thus, in case of identical input signals the output signal switches potential at the output of the comparator to the opposite sign. Moreover, the inverting Schmitt trigger may exhibit hysteresis. In case of changes in output state, the reference voltage at the non-inverting input changes resulting in two different reference voltage values and, thus, in two different values for switching the output state.

As long as $V_{ref} > V_{meas}$, i.e. for a "high" output state, the capacitor will be charged by the photoconductor until the measurement voltage and the reference voltage are identical. Then the output state may change to "low" and the capacitor will charge to the voltage with opposite sign until the next switch of output state. The electrical resistance $R_{photo}$ of the photoconductor is determinable from a charge-discharge-frequency at the output terminal of the photoconductor readout circuit. A charge-discharge speed of the capacitor may depend on the resistance $R_{photo}$, and specifically, will be higher the smaller $R_{photo}$. Thus, the charge-discharge-frequency measured at the output terminal depends on the electrical resistance $R_{photo}$ of the photoconductor. The photoconductor readout circuit comprises the at least one output terminal. As used herein, the term "output terminal" is a broad term and is to be given its ordinary and customary meaning to a person of ordinary skill in the art and is not to be limited to a special or customized meaning. The term specifically may refer, without limitation, to an arbitrary electronic element allowing tapping voltage of the output of the comparator circuit. In particular, the output terminal may be connected in series with the output of the comparator. As used herein, the term "charge-discharge-frequency" is a broad term and is to be given its ordinary and customary meaning to a person of ordinary skill in the art and is not to be limited to a special or customized meaning. The term specifically may refer, without limitation, to a time constant for charging or discharging the capacitor between two switchings in output state. Thus, the resistivity measurement of the photoconductor may be transformed to a frequency measurement.

The photoconductor readout circuit may comprise at least one amplifier, in particular at least one impedance converter, configured for amplifying the output signal of the comparator circuit.

The device, in particular the photoconductor readout circuit, may comprise at least one coupling to at least one evaluation device. The photoconductor readout circuit may comprise at least one rectifier and at least one further voltage divider for coupling to a low voltage evaluation system such as at least one microcontroller for the frequency measurement. The coupling may comprise at least one diode and at least one coupling voltage divider circuit. The coupling may be arranged at the output of the comparator circuit.

The photoconductor readout circuit comprises at least one bias voltage source configured for applying at least one modulated bias voltage to the photoconductor. As used herein, the term "bias voltage source" refers to at last one voltage source configured for generating the bias voltage. The bias voltage may be the voltage applied across the photoconductor material. Common read-out circuits may be based on voltage dividers which are susceptible to the fluctuations in the bias voltage. Any noise in the bias voltage can be measured as measurement voltage at the output of the voltage divider. In the circuit according to the present invention, the reference voltage divider and the measurement voltage divider may be connected to the same potential, which is the output voltage of the comparator. This may allow removing the susceptibility to the fluctuations.

As used herein, the term "modulated bias voltage" refers to the fact that the bias voltage is a periodical time-dependent bias voltage and/or alternating bias voltage. The bias voltage source may be configured for changing the bias voltage with each charge and/or discharge. As used herein, the term "modulation" refers to a change of polarization of the bias voltage on the photoconductor in such a way that the net flow of the charge carriers through the photoconductor is over a measurement period zero. Specifically, the bias voltage is selected such that an integral of charge carriers, such as the total current which flows through the photoconductor over a measurement period is zero. The measurement period may be the time between two consecutive transitions of the bias voltage polarization in the same direction, such as from rising edge, e.g. a positive edge, to rising edge or from falling edge, e.g. negative edge, to falling edge. The change of the bias voltage with each charge or discharge may allow protecting the photoconductor from resistivity drifts. Usually, photoconductors are measured with a DC bias voltage which can lead to a drift of ions in the photoconductive material or substrate, which changes the properties of the photoconductor. With an alternating bias voltage of an adequate frequency, as proposed in the present invention, the drift of the ions can be counterbalanced. An alternating bias voltage may reduce noises like flicker noise, 1/f or pink noise. F-noise can be significantly reduced due to the modulation of the measurement and the realization of higher frequencies. At the output the frequency may be measured using one or more operations of the group consisting of: at least one Fourier transformation; a counting of frequency, an edge detection, a period length measurement, and the like. The bias voltage can be from ±0.001 V to ±5000 V. Preferably, the bias voltage may be from ±0.1 V to ±500 V and most preferably the bias voltage may be from ±1 V to ±50 V. The bias voltage may be switching between positive and negative. The photoconductor may feature a resistance asymmetry for positive and negative bias voltages. Since the integral of the charge carriers in the proposed circuit over a measurement period is zero, the asymmetry may not affect the resistance measurement. An electrical field across the photoconductive material due to the applied bias voltage may be about 50V/mm.

The photoconductor readout circuit may comprise a plurality of photoconductors. The photoconductors may be arranged in an array. The photoconductor readout circuit may be configured for determining electrical resistance of each photoconductor of the plurality of photoconductors. The photoconductor readout circuit for readout of the plurality of photoconductors may comprise at least one logic gate such as a programmable logic, e.g. at least one Field Programmable Gate Array (FPGA), integrated circuit with a single or multiple input channels, a microprocessor with single or multiple inputs. The FPGA may be configured as an free running ring oscillator. Due to this, it may be possible to generate a very high time resolution in the measurement of an output frequency of the comparator.

The photoconductor readout circuit may further comprise at least one analog-to-digital converter (ADC) configured for converting the output signal into a digital signal, specifically for further evaluation.

The photoconductor readout circuit may be embodied as integrated circuit. The term "integrated circuit" as used herein is a broad term and is to be given its ordinary and customary meaning to a person of ordinary skill in the art and is not to be limited to a special or customized meaning. The term specifically may refer, without limitation, to an electronic circuit on a substrate such as a semiconductor substrate. For example, the integrated circuit may be embodied as a microchip.

In an embodiment, the device may comprise at least one first electronic circuit. The first electronic circuit may be configured for generating at least one first output signal. A frequency of the first output signal may be a mathematical function of said measurement period of the photoconductor. The output of the photoconductor readout circuit may be frequency depending on the resistance of the photoconductor. A counter may be required for measuring the frequency as the output of the photoconductor readout circuit. Since the higher frequencies are required for reducing the 1/f noise, counter may be configured for sampling the high frequency with high precision and with low noise, such as Jitter.

The device may comprise at least one second photoconductor configured for exhibiting an electrical resistance $R_{photo2}$ dependent on an illumination of its light-sensitive region. The device may comprise at least one second electronic circuit configured for generating a second measurement period. The second electronic circuit may be configured for generating at least one second output signal. A frequency of the second output signal may be a mathematical function of the measurement periods of the photoconductor and of the second photoconductor.

The second electronic circuit may be a frequency mixer. For dual detector applications, such as non-dispersive infrared spectroscopy for gas analysis, where one detector measures light intensity at one specific wavelength and one detector measures light intensity at another wavelength, two measured signals need to be compared. Another example may be emissivity independent temperature measurement, wherein the radiant power of the measurement object may be measured at two different wavelengths and the signals are compared. The second electronic circuit responsible for the frequency counting may be configured for sampling two signals with the same precision and low noise. This may even increase requirements and cost of the frequency counters. Alternatively, period length counters can be employed. The requirements for period length and frequency counters may remain the same. Output signals of both photoconductor readout circuits for the dual applications may be digitalized individually. Since the output signal of both photoconductor readout circuits may be a frequency, both frequencies may be sampled with frequency counters, which can be realized in form of timers with microcontrollers, FPGAs, Time-to-digital converters (TDC). This approach may require two input channels for microcontroller and FPGAs or to employ two of these counters with very good time resolution. Additionally or alternatively, the frequencies of both photoconductor readout circuits can be mixed by means of a frequency mixer on analog level before digitalization. A frequency mixer may be or may comprise a nonlinear electrical circuit configured for generating new frequencies from two signals applied to it. The frequency mixer may be configured for taking two applied signals and generating new signals equal to the difference and sum of the originating frequencies. The sum of the originating frequencies, i.e., the output signals of photoconductor readout circuits, can be filtered by means of a simple low pass filter, while the difference may be sampled.

For example, two frequencies $f_1=10000$ Hz and $f_2=9960$ Hz may be mixed and filtered to $f_{Mixed}=f_1-f_2=40$ Hz, which can be measured with very good resolution even with ordinary period or frequency counter. In this way, the requirements and the cost, in particular a number of the counters, may decrease, while the resolution increases. The measurement resolution may be increased by a heterodyne factor, in particular a ratio of the carrier $f_1$ to a beat frequency $f_{Mixed}$, $f_1/f_{Mixed}$. In this described example the heterodyne factor is 10000/40=250. Thus, a period counter with 100 nanosecond resolution can resolve changes in the period length of 400 picosecond.

Frequency mixer are generally known to the skilled person. Wide variety of frequency mixers are available, in particular for different frequency ranges, noise levels, packaging form, as integrated circuits or as discrete elements and the like.

The device may comprise at least one temperature sensitive element. A signal of the temperature sensitive element may be used to correct one or both of the first output signal of the first electronic circuit or the second output signal.

The device may comprise at least one third resistor for exhibiting an irradiation independent electrical resistance with the same temperature dependency as the photoconductor and the second photoconductor. The third resistor may either a photoconductor, darkened in such a way that it experience no irradiation, or a non-photosensitive resistor. The device may comprise at least one third electronic circuit configured for generating a third frequency. The third frequency may serve as a reference frequency. The reference frequency may be used to generate a difference of the frequencies from the illuminated photoconductors by means of at least two electronic circuits. The measured resistance and specific detectivity at the measured wavelength may drift due to a thermal change, e.g. environmental temperature effects, instability of employed thermoelectric cooler and the like. Thus, an additional darkened photoconductor, which is covered in such a way that its active area does not see any irradiation, may be employed. An output frequency of this detector may serve as a reference $f_{Ref}$. By using a dual-mixer setup, the difference of $f_{Mixed1}=f_1-f_{Ref}$ and $f_{Mixed2} = f_2 - f_{Ref}$ can be measured with high precision. By calculating the quotient $f_{Mixed1}/f_{Mixed2}$, the temperature dependency of $f_1$ and $f_2$ may be eliminated. For example, if the temperature coefficient of the photoconductor is α, than the quotient for a temperature T is $$\frac{f_{mixed1}(T)}{f_{mixed2}(T)} = \frac{f_1\alpha(T) - f_{Ref}\alpha(T)}{f_2\alpha(T) - f_{Ref}\alpha(T)} = \frac{f_1 - f_{Ref}}{f_2 - f_{Ref}},$$

thus temperature independent.

Additionally, a frequency divider may be employed in such a way that its frequency output is a power-of-2 integer division of the input signal, whereas the power can be chosen freely. For a power of 5, the output frequency will be ⅟₃₂ of the input frequency. A cheap temperature sensor, such as a Negative Temperature Coefficient Thermistor (NTC) can be built to measure the temperature of the photoconductor. The temperature dependency of the dark resistance can be factory calibrated, and the measurement value may be corrected with the temperature dependent calibration factor.

In a further aspect of the present invention, a detector comprising at least one photoconductor readout circuit according to the present invention is disclosed. The detector furthermore comprises at least one evaluation device configured for determining an output signal at at least one output of the device, in particular of the photoconductor readout circuit. The evaluation device is configured for determine an electrical resistance $R_{photo}$ of the photoconductor by evaluating the output signal.

As used herein, the term "evaluation device" generally refers to an arbitrary device designed to determine and/or generating at least one voltage output signal at the voltage output. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the voltage signal, such as one or more AD-converters and/or one or more filters. Further, the evaluation device may comprise one or more data storage devices. The evaluation device may comprise one or more interfaces, such as one or more wireless interfaces and/or one or more wire-bound interfaces. The evaluation device may particularly comprise at least one data processing device, in particular an electronic data processing device, which can be designed to determine at least one output voltage signal. The evaluation device can also be designed to completely or partly control the at least one illumination source and/or to control the at least one voltage source and/or to adjust the at least one load resistor. The evaluation device may further comprise one or more additional components, such as one or more electronic hardware components and/or one or more software components, such as one or more measurement units and/or one or more evaluation units and/or one or more controlling units. For example, the evaluation device may comprise at least one measurement device adapted to measure the at least one output voltage signal, e.g. at least one voltmeter. The evaluation device may be configured for performing one or more operations of the group consisting of: at least one Fourier transformation; a counting of frequency, an edge detection, a measurement of the period length and the like.

The detector may comprise at least one illumination source.

For further details concerning this aspect of the present invention, in particular further details of the photoconductor readout circuit, the evaluation device and the optional illumination source, reference may be made to the description of the photoconductor readout circuit as provided above and in more detail below.

In a further aspect of the present invention, a use of a device according to the present invention is disclosed for a purpose of readout of one or more of at least one PbS sensor, at least one PbSe sensor, or at least one pixelated sensor array comprising a plurality of pixels, wherein each of the pixels comprises at least one PbS or PbSe sensor. In particular, the device according to the present invention may be used in modest or low bias voltage applications, for example in applications where devices are battery operated or need to run on low power e.g. sensor nodes, portable measurement devices, devices in explosive atmospheres, allowing an improved signal-to-noise ratio and thus high signal quality. For example, the voltage divider circuit may be used in spectrometers, moisture measurement instruments, thickness measurement instruments, gas analysis instruments or any other type of equipment using photoresistors as sensor element. The device may be used in optical sensors. For example, the voltage divider circuit may be used in optical sensors which employ the so-called FiP effect, for example WO 2012/110924 A1, WO 2014/097181 A1 and WO 2016/120392 A1. Known voltage divider circuits cannot measure the change of the resistance with high resolution without any light modulation, such that the spectrometers with photoconductive detectors can only be realized with dispersive elements and multiple pixels. Single pixel spectrometers use photodiodes and other current generating detectors, like InGaS, Si-Photodiodes etc., due to their stability which allows the measurement without light modulation. Since the device according to the present invention can measure the resistance change of the photoconductor without any light modulation with high precision, single pixel spectrometers based on Michelson Interferometers, or Fabry Perot Interferometer etc. can be realized also with photoconductive detectors. The proposed device with all the mentioned advantages may be used to build single pixel spectrometers.

Summarizing, in the context of the present invention, the following embodiments are regarded as particularly preferred:

Embodiment 1: A device comprising
at least one photoconductor configured for exhibiting an electrical resistance $R_{photo}$ dependent on an illumination of a light-sensitive region of the photoconductor;
at least one photoconductor readout circuit, wherein the photoconductor readout circuit is configured for determining the electrical resistance $R_{photo}$ of the photoconductor, wherein the photoconductor readout circuit comprises at least one bias voltage source configured for applying at least one modulated bias voltage to the photoconductor.

Embodiment 2: The device according to the preceding embodiment, wherein the bias voltage is a periodical time-dependent bias voltage, wherein the bias voltage is selected such that an integral of charge carriers which flows through the photoconductor over a measurement period is zero, wherein the measurement period is defined by a time between two consecutive transitions of a bias voltage polarization in the same direction.

Embodiment 3: The device according to any one of the preceding embodiments, wherein the photoconductor readout circuit comprises:
  at least one measurement voltage divider circuit comprising at least one photoconductor configured for exhibiting an electrical resistance $R_{photo}$ dependent on an illumination of a light-sensitive region of the photoconductor and at least one capacitor in series with the photoconductor, wherein the capacitor is chargeable by the photoconductor;
  at least one comparator circuit comprising at least one reference voltage divider circuit and at least one comparator, wherein the comparator comprises at least one input, wherein a first input is electrically connected with an output of the measurement voltage divider circuit, wherein the comparator is configured for changing between two output states when input voltage at the first input is identical with at least one reference voltage;
  at least one output terminal, wherein the electrical resistance $R_{photo}$ of the photoconductor is determinable from a charge-discharge-frequency at the output terminal.

Embodiment 4: The device according to the preceding embodiment, wherein the reference voltage divider circuit comprises at least two reference resistors each having a predefined or predetermined resistance.

Embodiment 5: The device according to any one of the two preceding embodiments, wherein the comparator is or comprises one or more of: at least one operational amplifier; at least one Schmitt trigger; at least one logic elements based on emitter coupled logic (ECL); at least one transistor-transistor logic (TTL) such as at least one advanced Schottky (ASTTL), at least one FAST-Schottky, at least one High Speed CMOS and at least one CMOS; and at least one Tri-state logic comparator.

Embodiment 6: The device according to any one of the preceding three embodiments, wherein the comparator is configured for comparing the input voltage with at least one reference voltage and for generating an output signal indicating a result of the comparison.

Embodiment 7: The device according to any one of the four preceding embodiments, wherein a charge-discharge speed of the capacitor depends on the resistance $R_{photo}$.

Embodiment 8: The device according to any one of the five preceding embodiments, wherein the photoconductor readout circuit comprises at least one amplifier configured for amplifying an output signal of the comparator circuit.

Embodiment 9: The device according to any one of the preceding embodiments, wherein the device comprises at least one coupling to at least one evaluation device.

Embodiment 9: The device according to any one of the preceding embodiments, wherein the light-sensitive region comprises at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, organic semiconductors.

Embodiment 10: The device according to embodiment 2, wherein the device comprises at least one first electronic circuit, wherein the first electronic circuit is configured for generating at least one first output signal, wherein a frequency of the first output signal is a mathematical function of said measurement period of the photoconductor.

Embodiment 11: The device according to the preceding embodiment, wherein the device comprises at least one temperature sensitive element, wherein a signal of the temperature sensitive element is used to correct the first output signal of the first electronic circuit.

Embodiment 12: The device according to any of the two preceding embodiments, wherein the device comprises at least one second photoconductor configured for exhibiting an electrical resistance $R_{photo2}$ dependent on an illumination of its light-sensitive region, wherein the device comprises at least one second electronic circuit configured for generating a second measurement period, wherein the second electronic circuit is configured for generating at least one second output signal, wherein a frequency of the second output signal is a mathematical function of the measurement periods of the photoconductor and of the second photoconductor.

Embodiment 13: The device according to the preceding embodiment, wherein the second electronic circuit is a frequency mixer.

Embodiment 14: The device according to any one of the two preceding embodiments, wherein the device comprises at least one third resistor for exhibiting an irradiation independent electrical resistance with the same temperature dependency as the photoconductor and the second photoconductor, wherein the third resistor is either a photoconductor, darkened in such a way that it experience no irradiation, or a non-photosensitive resistor, wherein the device comprises at least one third electronic circuit configured for generating a third frequency, wherein the third frequency serves as a reference frequency, wherein the reference frequency is used to generate a difference of the frequencies from the illuminated photoconductors by means of at least two electronic circuits.

Embodiment 15: A detector comprising at least one device according to any one of the preceding embodiments, wherein the detector comprises at least one evaluation device configured for determining an output signal at at least one output of the device, wherein the evaluation device is configured for determining an electrical resistance $R_{photo}$ of the photoconductor by evaluating the output signal.

Embodiment 16: The detector according to the preceding embodiment, wherein the evaluation device is configured for performing one or more operations of the group consisting of: at least one Fourier transformation; a counting of frequency, an edge detection, a measurement of the period length, and the like.

Embodiment 17: Use of a device according to any one of the preceding embodiments referring to a device, for a purpose of readout of one or more of at least one PbS sensor, at least one PbSe sensor, or at least one pixelated sensor array comprising a plurality of pixels, wherein each of the pixels comprises at least one PbS or PbSe sensor.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
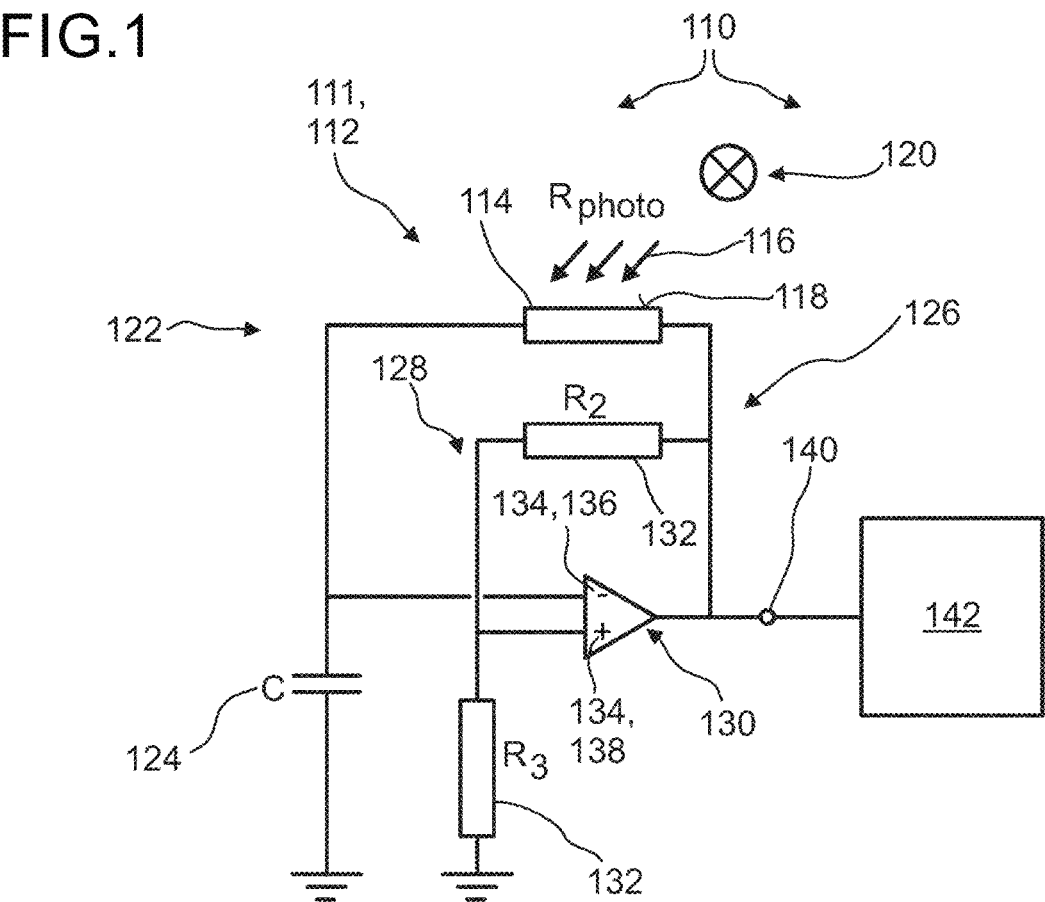
FIG. 1 shows an exemplary embodiment of a detector comprising a device according to the present invention.

FIG. 1 illustrates, in a highly schematic fashion, an exemplary embodiment of a detector 110 comprising at least one device 111 according to the present invention comprising at least one photoconductor readout circuit 112. The device 111 comprises at least one photoconductor 114 configured for exhibiting an electrical resistance $R_{photo}$ dependent on an illumination 116 of a light-sensitive region 118 of the photoconductor 114.

The electrical resistance $R_{photo}$ may be dependent on the illumination of a material of the photoconductor 114. The light-sensitive region 118 of the photoconductor 114 may comprise a photoconductive material. The light-sensitive region 118 may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs. However, other materials may be feasible. Further possible photoconductive materials are described in WO 2016/120392 A1, for example. For example, the photoconductor may be a photoconductor commercially available under the brand name Hertzstueck™ from trinamiX GmbH, D-67056 Ludwigshafen am Rhein, Germany.

For example, the light-sensitive region 118 may be illuminated by at least one illumination source 120. The illumination source 120 can for example be or comprise an ambient light source and/or may be or may comprise an artificial illumination source. The detector 110 may comprise at least one illumination source 120 configured for illuminating the light-sensitive region 118. By way of example, the illumination source 120 may comprise at least one infrared emitter and/or at least one emitter for visible light and/or at least one emitter for ultraviolet light. By way of example, the illumination source 120 may comprise at least one light emitting diode and/or at least one laser diode. The illumination source 120 can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source 120 generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm. The illumination source 120 may comprise at least one continuous or at least one non-continuous light source.

The photoconductor readout circuit 112 comprises at least one measurement voltage divider circuit 122 comprising the at least one photoconductor 114 and at least one capacitor C 124 in series with the photoconductor 114. The capacitor C 124 is chargeable by the photoconductor 114. In particular at least one output of the photoconductor 114 may be electrically connected with at least one input of the capacitor 124. The smaller the electrical resistance $R_{photo}$ the faster the capacitor C will be charged. In a common voltage divider, the maximum dynamic range of the output signal is achieved when the resistance values of both resistors are the same. Photoconductors may have generally resistance values >100 kΩ. Large resistor values may lead to a high thermal noise in the circuit. The low-noise, high temperature stability resistors based on metal foil technology can commonly be found for lower resistance values and thus are not applicable as voltage dividers. In the circuit according to the present invention, the resistor of the measurement voltage divider is replaced with the capacitor 124. The capacitor C 124 may be furthermore connected to ground.

The photoconductor readout circuit 112 comprises at least one comparator circuit 126 comprising at least one reference voltage divider circuit 128 and at least one comparator 130. The comparator circuit 126 may be configured for comparing at least one input voltage with at least one reference voltage and for outputting an output signal indicating the result of the comparison. The comparator circuit 126 may be embodied as inverting Schmitt trigger. The inverting Schmitt trigger may comprise the comparator 130 and a positive feedback to the noninverting input of the comparator implemented by a voltage divider circuit, in the present case the reference voltage divider 128. The reference voltage divider circuit 128 may comprise at least two reference resistors 132, denoted as $R_2$ and $R_3$ in FIG. 1, each having a predefined or predetermined resistance. Resistor $R_2$ may be connected in series with resistor $R_3$. Resistor $R_2$ may be connected to the output of the comparator 130. $R_3$ may be furthermore connected to ground. The comparator 130 may be or may comprise one or more of: at least one operational amplifier; at least one Schmitt trigger; at least one logic elements based on emitter coupled logic (ECL); at least one transistor-transistor logic (TTL) such as at least one advanced Schottky (ASTTL), at least one FAST-Schottky, at least one High Speed CMOS and at least one CMOS; and at least one Tri-state logic comparator.

For the resistors in the reference voltage divider circuit 128, only the ratio of the resistors may be important. The ratio of the reference resistors in the reference voltage divider circuit may remain the same as long as the resistance values of both resistors are changed with the same factor, which allows to use resistors with a long range of resistance values.

The comparator 130 comprises at least one input 134, in particular as shown in FIG. 134 two input terminals. The comparator may comprise the at least one first input 136 and at least one second input 138. Specifically, the comparator 130 may have a non-inverting input (+) and an inverting input (−). The output of the reference voltage divider 128 may be connected to the non-inverting input of the comparator while the output of the measurement voltage divider 122 may be connected to the inverting input. Thus, the first input 136 is electrically connected with the output of the measurement voltage divider circuit 122 and the second input is electrically connected with the output of the reference voltage divider circuit 128. The first input 136 may be the inverted input and the second input may be the non-inverted input. The reference voltage divider 128 may be configured for providing a positive feedback to the comparator 130. In particular, the reference voltage divider 128 may be arranged such that part of the output voltage of the comparator 130 appears at the non-inverting input.

The output signal, also denoted output voltage, of the comparator 130 may depend on the result of the comparison of the input voltage at the first input 136 with at least one reference voltage. In the embodiment of FIG. 1, the reference voltage may be the input voltage at the second input 138. The voltage at the first input 136 is denoted herein as measurement voltage signal $V_{meas}$ and the voltage at the second input 138 is denoted as reference voltage signal $V_{ref}$. The comparator 130 is configured for changing between two output states when input voltages at the first input and second input are identical. The output signal may be a digital signal, in particular a binary digital output having two states denoted as output states. The output state $V_{out}$ may depend on which of the input voltages is larger:

$$V_{out} = \begin{cases} \text{high if } V_{ref} > V_{meas} \\ \text{low if } V_{ref} < V_{meas} \end{cases}.$$

When the measurement voltage is less than the reference voltage the output voltage will be "high". The "high" output state may be positive, in particular equal to a positive saturation voltage. When the measurement voltage becomes equal to the reference voltage, i.e. by further charging of the capacitor, the comparator changes the output state to "low", which is in particular equal to a negative saturation voltage. In this case of switching from high to low output state, a negative voltage may appear at the non-inverting input as a result of the negative saturation voltage at the output of the comparator 130. Thus, in case of identical input signals the output signal switches potential at the output of the comparator 130 to the opposite sign. Moreover, the inverting Schmitt trigger may exhibit hysteresis. In case of changes in output state, the reference voltage at the non-inverting input changes resulting in two different reference voltage values and, thus, in two different values for switching the output state.

As long as $V_{ref} > V_{meas}$, i.e. for a "high" output state, the capacitor 124 will be charged by the photoconductor 114 until the measurement voltage and the reference voltage are identical. Then the output state may change to "low" and the capacitor 124 will charge to the voltage with opposite sign until the next switch of output state. The electrical resistance $R_{photo}$ of the photoconductor 114 is determinable from a charge-discharge-frequency at the output terminal of the photoconductor readout circuit. A charge-discharge speed of the capacitor 124 may depend on the resistance $R_{photo}$, and specifically, will be higher the smaller $R_{photo}$. Thus, the charge-discharge-frequency measured at an output terminal 140 depends on the electrical resistance $R_{photo}$ of the photoconductor 114. The photoconductor readout circuit 112 comprises the at least one output terminal 140. The output terminal 140 may be connected in series with the output of the comparator 130. The charge-discharge-frequency may be a time constant for charging or decharging the capacitor 124 between two switchings in output state. Thus, the resistivity measurement of the photoconductor 114 may be transformed to a frequency measurement.

The detector 110 furthermore comprises at least one evaluation device 142 configured for determining an output signal at at least one output 140 of the device, in particular of the photoconductor readout circuit 112. The evaluation device 142 is configured for determine an electrical resistance $R_{photo}$ of the photoconductor 114 by evaluating the output signal. The evaluation device 142 may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the voltage signal, such as one or more AD-converters and/or one or more filters. Further, the evaluation device 142 may comprise one or more data storage devices. The evaluation device 142 may comprise one or more interfaces, such as one or more wireless interfaces and/or one or more wire-bound interfaces. The evaluation device 142 may particularly comprise at least one data processing device, in particular an electronic data processing device, which can be designed to determine at least one output voltage signal. The evaluation device 142 can also be designed to completely or partly control the at least one illumination source and/or to control the at least one voltage source and/or to adjust the at least one load resistor. The evaluation device 142 may further comprise one or more additional components, such as one or more electronic hardware components and/or one or more software components, such as one or more measurement units and/or one or more evaluation units and/or one or more controlling units. For example, the evaluation device 142 may comprise at least one measurement device adapted to measure the at least one output voltage signal, e.g. at least one voltmeter. The evaluation device 142 may be configured for performing one or more operations of the group consisting of: at least one Fourier transformation; a counting of frequency, an edge detection, a measurement of the period length and the like.

Figure 2:
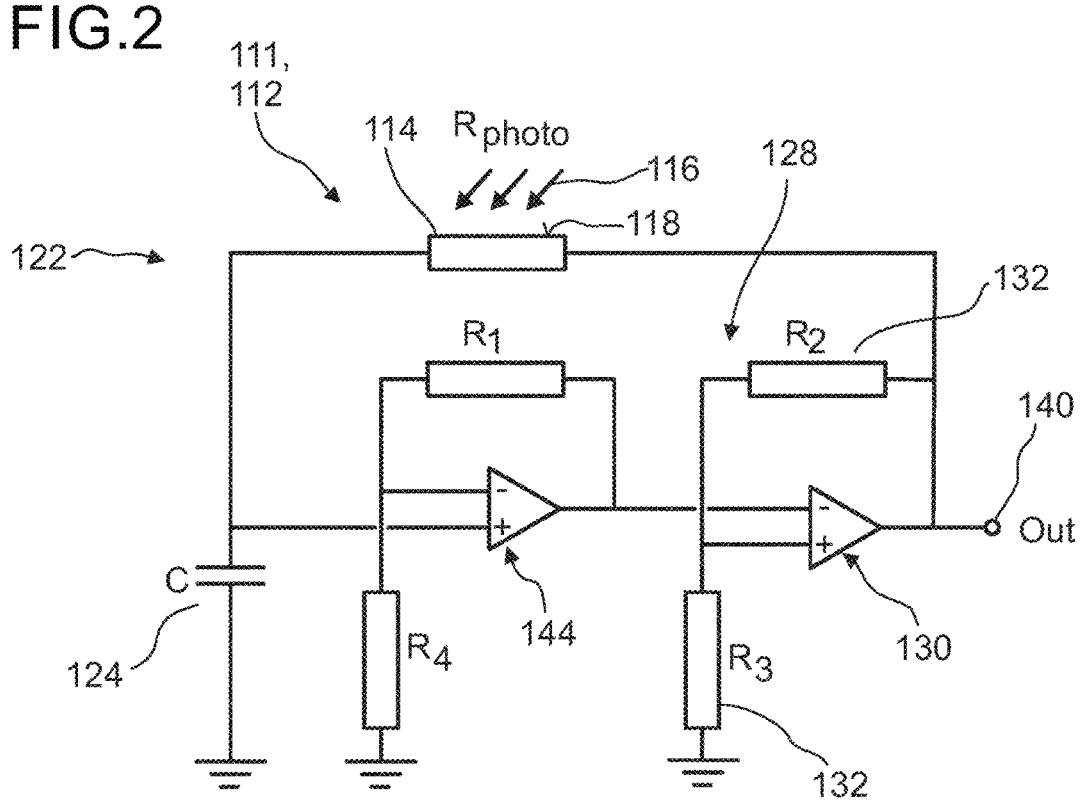
FIG. 2 shows a further exemplary embodiment of the device comprising a photoconductor readout circuit.

FIG. 2 shows a further embodiment of the device 111 and the photoconductor readout circuit 112. In addition to the elements shown in FIG. 1, in the embodiment of FIG. 2 the photoconductor readout circuit 112 comprises at least one additional amplifier 144, in particular at least one impedance converter, configured for amplifying the output signal of the comparator circuit 126. The additional amplifier 144 may be connected to a further voltage divider comprising resistors $R_1$ and $R_4$. Resistor $R_1$ may be connected to the output of the further amplifier 144 and to resistor $R_4$, wherein resistor $R_4$ may be connected to ground. The output of the further voltage divider may be connected to the non-inverting input of the additional amplifier 144.

Figure 3:
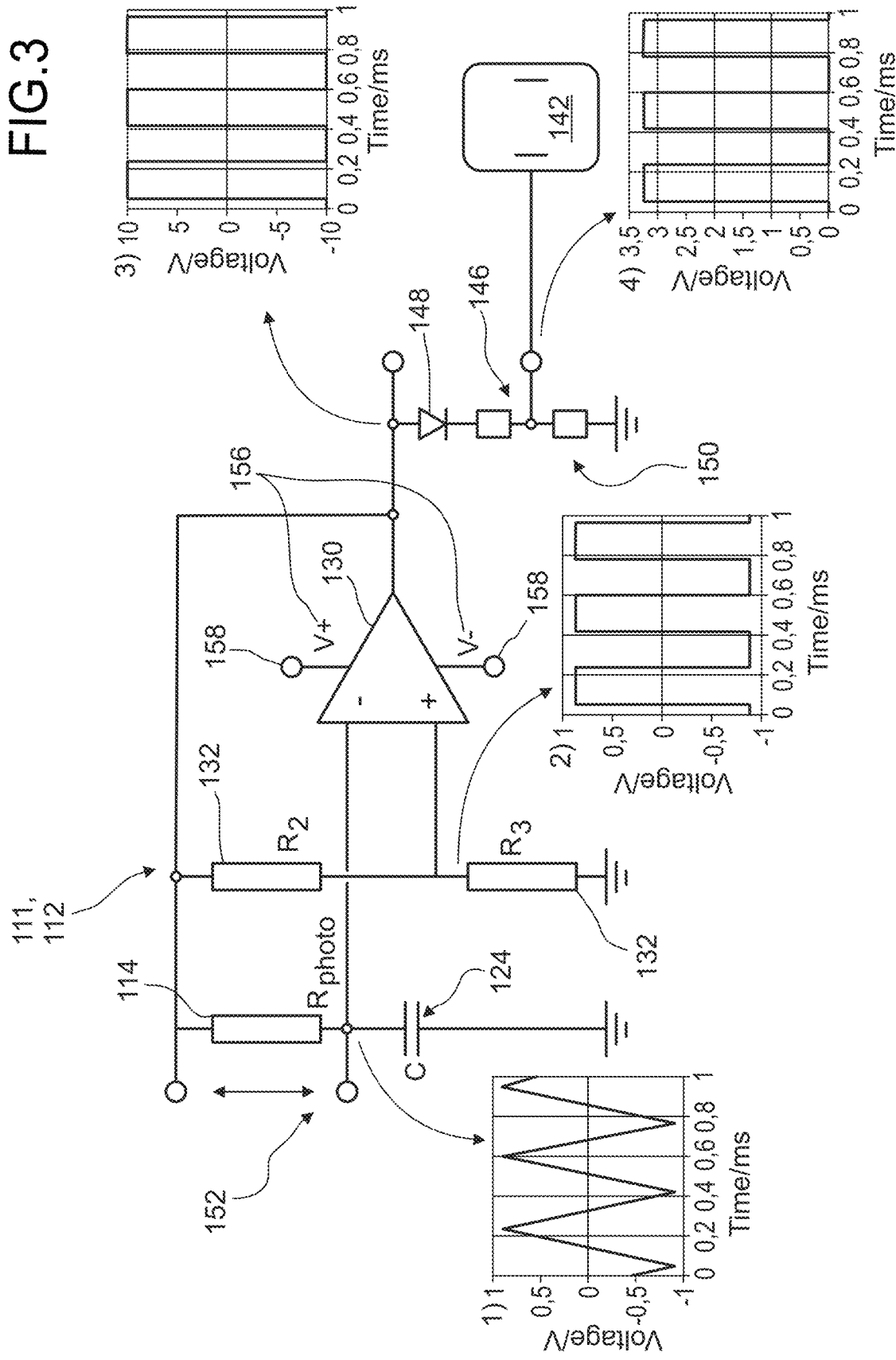
FIG. 3 shows a further exemplary embodiment of the device.

FIG. 3 shows a further embodiment of the device 111 and the photoconductor readout circuit 112. In addition to the elements shown in FIG. 1, in the embodiment of FIG. 3 the photoconductor readout circuit 112 comprises at least one coupling 146 to the at least one evaluation device 142. The photoconductor readout circuit 112 may comprise at least one rectifier 148 and at least one further voltage divider 150 for coupling to a low voltage evaluation system such as at least one microcontroller for the frequency measurement. The coupling 146 may comprise at least one diode and at least one coupling voltage divider circuit. The coupling 146 may be arranged at the output of the comparator circuit 126.

The photoconductor readout circuit 112 comprises at least one bias voltage source 152 configured for applying at least one modulated bias voltage to the photoconductor 114. Common read-out circuits may be based on voltage dividers which are susceptible to the fluctuations in the bias voltage. Any noise in the bias voltage can be measured as measurement voltage at the output of the voltage divider. In the circuit according to the present invention, the reference voltage divider 128 and the measurement voltage divider 122 may be connected to the same potential, which is the output voltage of the comparator. This may allow removing the susceptibility to the fluctuations. The modulated bias voltage may be a periodical time-dependent bias voltage and/or alternating bias voltage. The bias voltage source 152 may be configured for changing the bias voltage with each charge and/or discharge. The modulation may be a change of polarization of the bias voltage on the photoconductor 114 in such a way that the net flow of the charge carriers through the photoconductor 114 is over a measurement period zero. Specifically, the bias voltage is selected such that an integral of charge carriers, such as the total current which flows through the photoconductor 114 over a measurement period is zero. The measurement period may be the time between two consecutive transitions of the bias voltage polarization in the same direction, such as from rising edge, e.g. a positive edge, to rising edge or from falling edge, e.g. negative edge, to falling edge. The change of the bias voltage with each charge or discharge may allow protecting the photoconductor 114 from resistivity drifts. Usually, photoconductors are measured with a DC bias voltage which can lead to a drift of ions in the photoconductive material or substrate, which changes the properties of the photoconductor. With an alternating bias voltage of an adequate frequency, as proposed in the present invention, the drift of the ions can be counterbalanced. An alternating bias voltage may reduce noises like flicker noise, 1/f or pink noise. F-noise can be significantly reduced due to the modulation of the measurement and the realization of higher frequencies. At the output the frequency may be measured using one or more operations of the group consisting of: at least one Fourier transformation; a counting of frequency, an edge detection and the like. The bias voltage can be from ±0.001 V to ±5000 V. Preferably, the bias voltage may be from ±0.1 V to ±500 V and most preferably the bias voltage may be from ±1 V to ±50 V. The bias voltage may be switching between positive and negative. The photoconductor 114 may feature a resistance asymmetry for positive and negative bias voltages. Since the integral of the charge carriers in the proposed circuit over a measurement period is zero, the asymmetry may not affect the resistance measurement. An electrical field across the photoconductive material due to the applied bias voltage may be about 50V/mm.

The comparator 130 may be driven by a supply voltage 156. For example, two identical direct current (DC) voltages such in a range from ±0.001V to ±5000V, preferably ±1V to ±500V, more preferably ±2V to ±50V may be applied to supply inputs 158 of the comparator 130. The comparator 130 may be driven with single supply voltage 156, wherein the supply voltage 156 may be from ±0.001 V to ±5000 V. Preferably, the supply voltage 156 may be from ±0.1 V to ±500 V and most preferably the supply voltage 156 may be from ±1 V to ±50 V. Alternatively, the comparator 130 may be driven a dual supply voltage, where may be between ±0.001 V and ±5000 V. Preferably, the supply voltage 156 may be from ±0.1 V to ±500 V and most preferably the supply voltage 156 may be from ±1 V to ±50 V. The comparator dual supply voltage may be symmetrical or asymmetrical.

Moreover, FIG. 3 shows subfigures 1) to 4). Subfigure 1) shows an exemplary measurement voltage signal $V_{meas}$ in V as a function of time in ms. Subfigure 2) shows an exemplary reference voltage $V_{ref}$ in V as a function of time in ms. Subfigure 3) shows an exemplary output of the comparator 130. Subfigure 4) shows an exemplary input voltage in V as a function of time in ms of the evaluation device 142.

Figure 4:
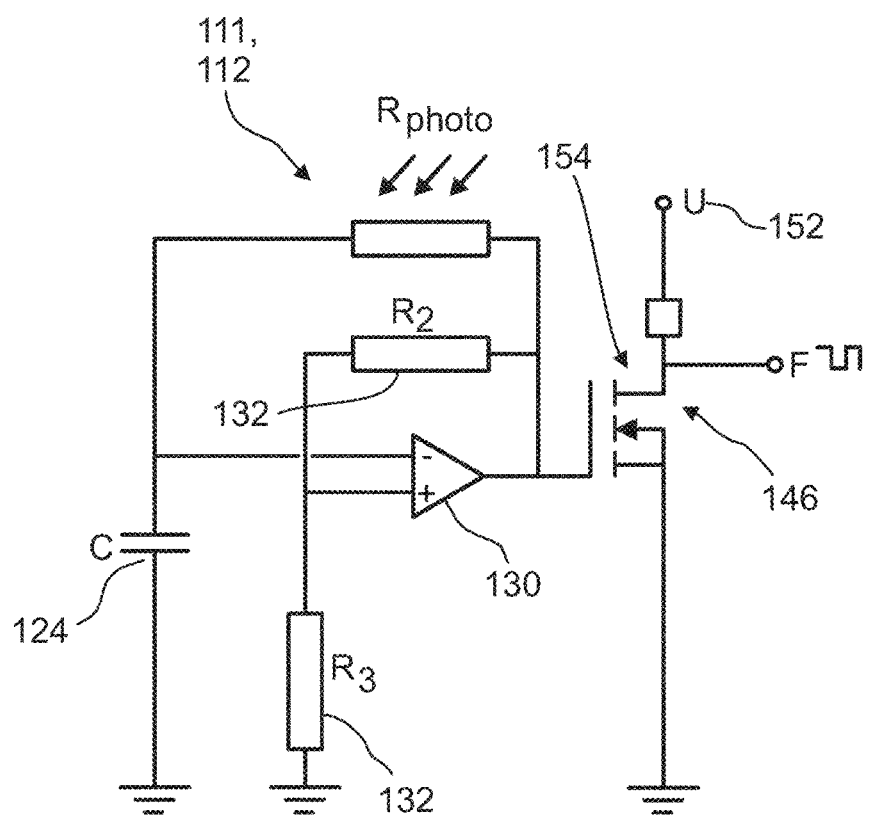
FIG. 4 shows a further exemplary embodiment of the device.

FIG. 4 shows a further embodiment of the device 111 and the photoconductor readout circuit 112. In addition to the elements shown in FIG. 1, in the embodiment of FIG. 4 the photoconductor readout circuit 112 comprises may comprise the at least one bias voltage source 152 configured for applying at least one bias voltage to the photoconductor 114. As shown in FIG. 4, the photoconductor readout circuit 112 comprises the coupling 146. In FIG. 4, the coupling 146 may comprise at least one metal-oxide-semiconductor field-effect transistor (MOSFET) 154.

Resistors $R_2$ and $R_3$ in FIGS. 1 to 4 may additionally or alternatively embodied as temperature dependent resistance such as at least one Negative Temperature Coefficient Thermistor (NTC), or at least one temperature sensitive diode, or at least one Positive Temperature Coefficient Thermistor (PTC), or at least one additional dark photoconductor. This may allow for compensating temperature dependency of the photoconductor 114.

Figure 5A:
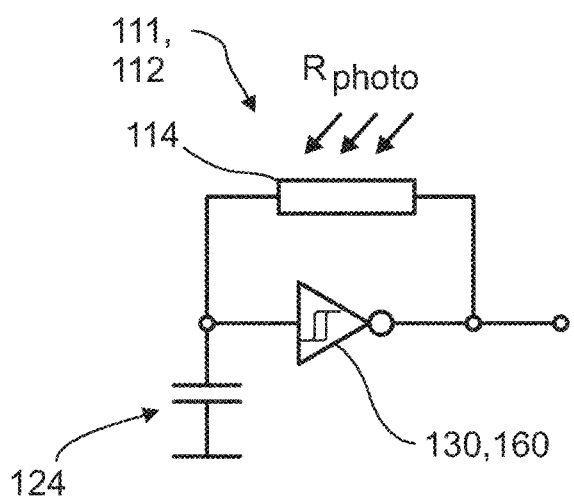
FIGS. 5A to 5C shows further exemplary embodiments of the device.
Figure 5B:
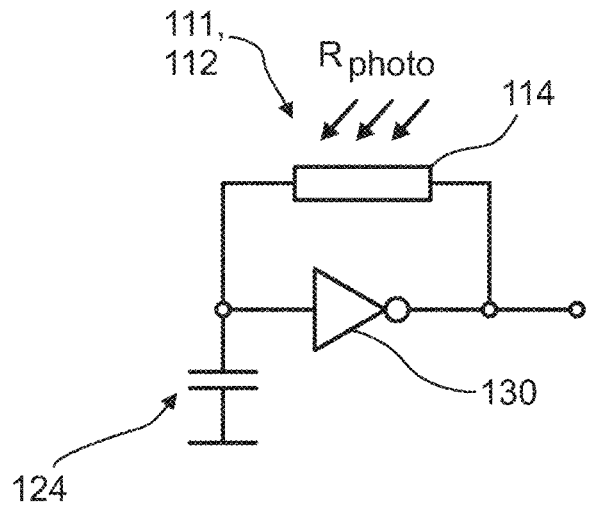
Figure 5C:
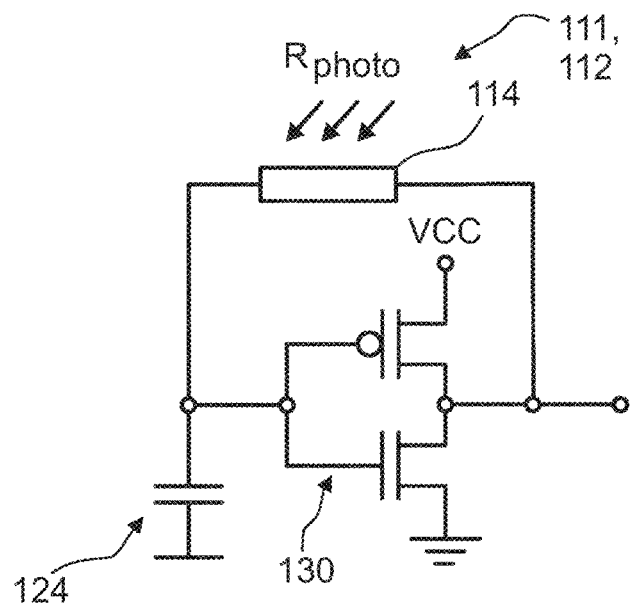

FIGS. 5A to 5C show further embodiments the device 111 and the photoconductor readout circuit 112 according to the present invention. In FIG. 5A, the comparator 130 is embodied as Schmitt trigger 160. The readout circuit works as explained with respect to FIGS. 1 to 4, but the comparator 130 comprises an internal comparison voltage which is used as reference voltage. In FIG. 5B, the comparator 130 is embodied as inverting gate. The inverting gate may work like a Schmitt trigger, wherein a threshold of the input voltage at the comparator is adapted to the circuit technology used. In case of a transistor-transistor logic (TTL), the threshold may be $U_e<0.8$ V for low-level, and $U_e>2$ V for high-level. Alternatively other digital circuit technology may be used such as a CMOS. In FIG. 5C, the comparator 130 may be embodied as an inverting circuit comprising discrete components, such as two transistors. Alternatively to integrated components embodiments may be possible in which the circuit may be composed of discrete components configured to generate an oscillation having a frequency depending on conductivity of the photoconductor 114.

Figure 6:
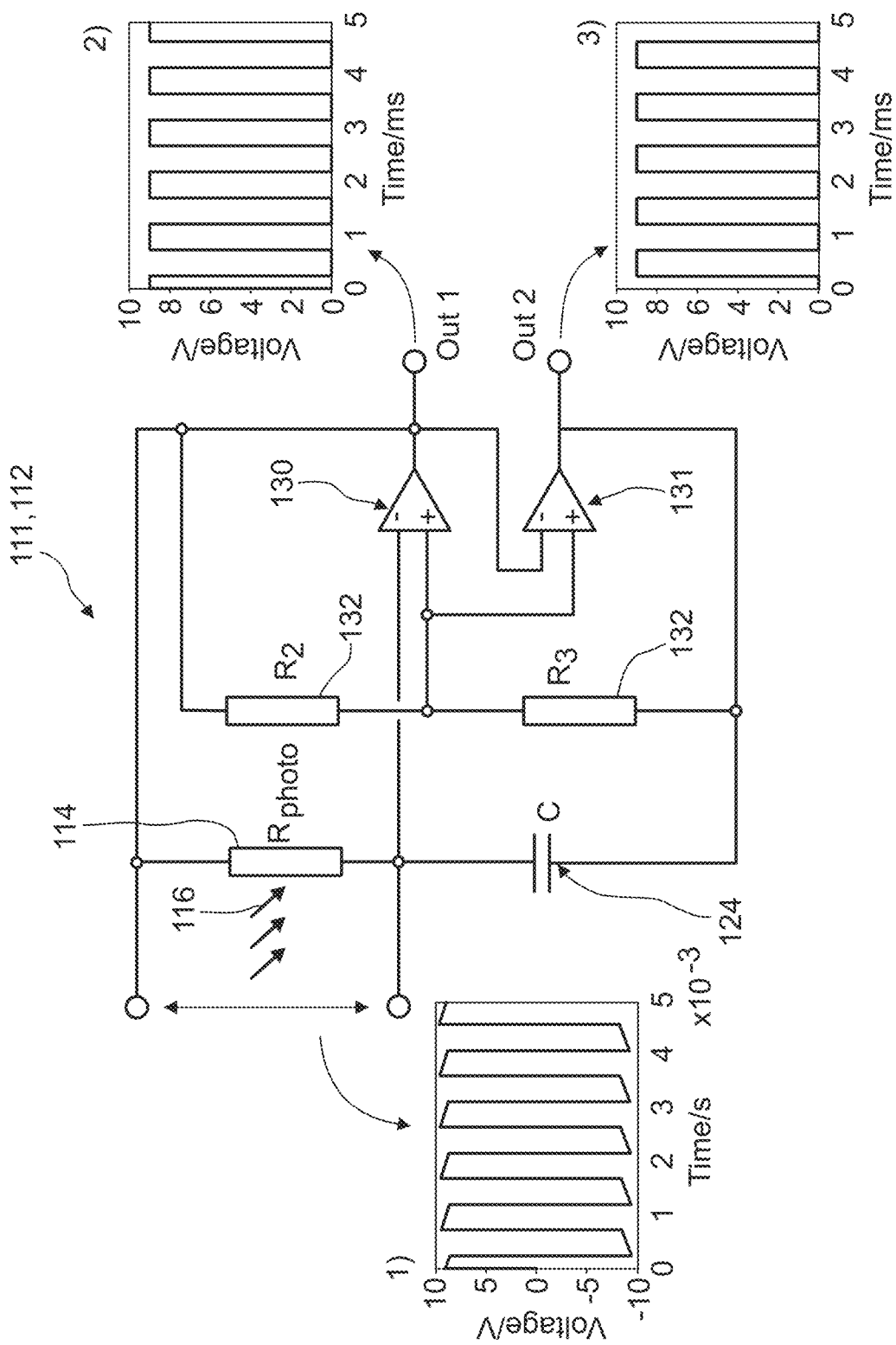
FIG. 6 shows a further embodiment of the device and the photoconductor readout circuit.

FIG. 6 shows a further embodiment of the device 111 and the photoconductor readout circuit 112. In addition to the elements shown in FIG. 1, in the embodiment of FIG. 6 the photoconductor readout circuit 112 comprises at least one additional comparator 131, whereas the output of the first comparator 130 is connected to an inverting input of the additional comparator 131. The non-inverting input of the comparator 130 and additional comparator 131 are connected to the same potential. Both comparators 130, 131 may be supplied with a single DC voltage source, such as a TTL power supply or a battery etc. with a constant DC supply voltage of $V_{supply}$. In this embodiment, the bias voltage applied on the photoconductor is still modulated, changing its polarization between $V_{supply}$ and $-V_{supply}$ in such a way that the net flow of the charge carriers through the photoconductor 114 is over a measurement period zero. Subfigure 1) shows an exemplary bias voltage on the photoconductor 114 in V as a function of time ins. Subfigure 2) shows an exemplary output of the comparator 130 as a function of time in s. Subfigure 3) shows an exemplary output of the additional comparator 131 as a function of time in s. The output of the additional comparator 131 may be phase-delayed of at least half a period compared to the output of the comparator 130. Alternatively, the comparator 130 and the additional comparator 131 may be substituted with a single comparator, which has two inputs and two outputs, whereas the outputs are differential to each other, which means that the output voltages are opposite in polarity referenced to the common-mode operating point of the circuit.

Figure 7A:
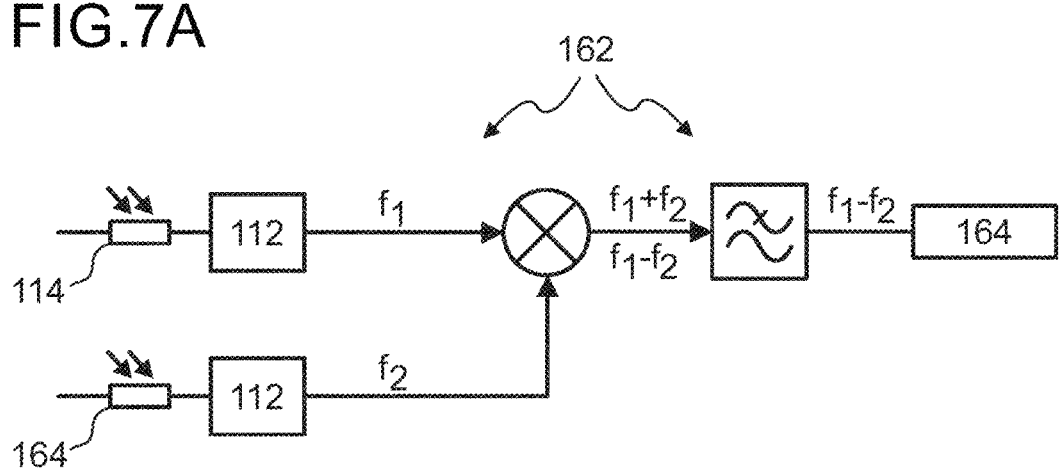
FIGS. 7A to 7C show embodiments in which the device comprises a plurality of photoconductors.

FIG. 7 show embodiments, wherein the device 111 comprises a plurality of photoconductors. FIG. 7A shows an embodiment, wherein the device 111 comprises at least one second electronic circuit 162. The device 111, in this embodiment comprises two photoconductors, the photoconductor 114 and a second photoconductor 164. The second electronic circuit 162 may be or may comprise a frequency mixer. The frequencies $f_1$ and $f_2$ of both photoconductor readout circuits 112 can be mixed by means of the frequency mixer on analog level before digitalization. The frequency mixer may be or may comprise a nonlinear electrical circuit configured for generating new frequencies from two signals applied to it. The frequency mixer may be configured for taking two applied signals and generating new signals equal to the difference and sum of the originating frequencies. The sum of the originating frequencies, i.e., the output signals of photoconductor readout circuits 112, can be filtered by means of a simple low pass filter, while the difference may be sampled, as visualized in FIG. 7A. The sampled difference may be measured by at least one counter 164.

For example, two frequencies $f_1=10000$ Hz and $f_2=9960$ Hz may be mixed and filtered to $f_{Mixed}=f_1-f_2=40$ Hz, which can be measured with very good resolution even with ordinary period or frequency counter. In this way, the requirements and the cost, in particular a number of the counters, may decrease, while the resolution increases. The measurement resolution may be increased by a heterodyne factor, in particular a ratio of the carrier $f_1$ to a beat frequency $f_{Mixed}$, $f_1/f_{Mixed}$. In this described example the heterodyne factor is 10000/40=250. Thus, a period counter with 100 nanosecond resolution can resolve changes in the period length of 400 picosecond.

Frequency mixer are generally known to the skilled person. Wide variety of frequency mixers are available, in particular for different frequency ranges, noise levels, packaging form, as integrated circuits or as discrete elements and the like.

Figure 7B:
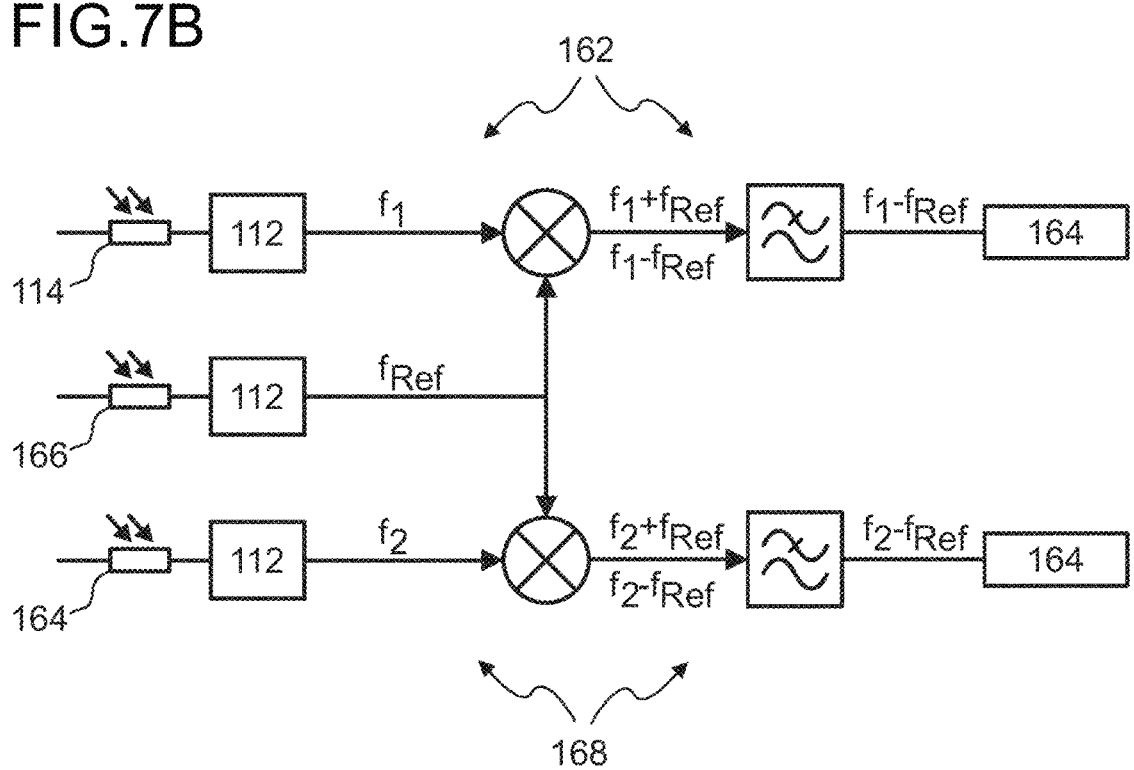

As shown in FIG. 7B, the device 111 may comprise at least one third resistor 166 for exhibiting an irradiation independent electrical resistance with the same temperature dependency as the photoconductor 114 and the second photoconductor 164. The third resistor 166 may either a photoconductor, darkened in such a way that it experience no irradiation, or a non-photosensitive resistor. The device 111 may comprise at least one third electronic circuit 168 configured for generating a third frequency $f_{Ref}$. The third frequency may serve as a reference frequency. The reference frequency may be used to generate a difference of the frequencies from the illuminated photoconductors by means of at least two electronic circuits 162, 168. The measured resistance and specific detectivity at the measured wavelength may drift due to a thermal change, e.g. environmental temperature effects, instability of employed thermoelectric cooler and the like. Thus, an additional darkened photoconductor, which is covered in such a way that its active area does not see any irradiation, may be employed. An output frequency of this detector may serve as a reference $f_{Ref}$. By using a dual-mixer set-up shown in FIG. 7B, the difference of $f_{Mixed1}=f_1-f_{Ref}$ and $f_{Mixed2}=f_2-f_{Ref}$ can be measured with high precision. By calculating the quotient $f_{Mixed1}/f_{Mixed2}$, the temperature dependency of $f_1$ and $f_2$ may be eliminated. For example, if the temperature coefficient of the photoconductor is $\alpha$, than the quotient for a temperature T is $$\frac{f_{mixed1}(T)}{f_{mixed2}(T)} = \frac{f_1\alpha(T) - f_{Ref}\alpha(T)}{f_2\alpha(T) - f_{Ref}\alpha(T)} = \frac{f_1 - f_{Ref}}{f_2 - f_{Ref}},$$

thus temperature independent.

Figure 7C:
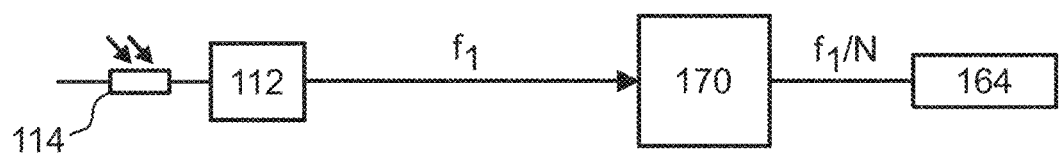

As shown in FIG. 7C, additionally, a frequency divider 170 may be employed in such a way that its frequency output is a power-of-2 integer division of the input signal, wherein the power can be chosen freely. For a power of 5, the output frequency will be 1/32 of the input frequency. A cheap temperature sensor, such as a Negative Temperature Coefficient Thermistor (NTC) can be built to measure the temperature of the photoconductor. The temperature dependency of the dark resistance can be factory calibrated, and the measurement value may be corrected with the temperature dependent calibration factor.

LIST OF REFERENCE NUMBERS 110 detector
111 device
112 photoconductor readout circuit
114 photoconductor
116 illumination
118 light-sensitive region
120 illumination source
122 measurement voltage divider circuit
124 capacitor
126 comparator circuit
128 reference voltage divider circuit
130 comparator
131 comparator
132 reference resistor
134 input
136 first input
138 second input
140 output terminal
142 evaluation device
144 additional amplifier
146 coupling
148 rectifier
150 further voltage divider
152 bias voltage source
154 MOSFET
156 supply voltage
158 supply input
160 Schmitt trigger
162 second electronic circuit
164 counter
166 third resistor
168 third electronic circuit
170 Frequency divider

The invention claimed is:

1. A device comprising
at least one photoconductor configured for exhibiting an electrical resistance $R_{photo}$ dependent on an illumination of a light-sensitive region of the photoconductor; and
at least one photoconductor readout circuit, wherein the photoconductor readout circuit is configured for determining the electrical resistance $R_{photo}$ of the photoconductor, wherein the photoconductor readout circuit comprises at least one bias voltage source configured for applying at least one modulated bias voltage to the photoconductor;

wherein the bias voltage is a periodical time-dependent bias voltage, wherein the bias voltage is selected such that an integral of charge carriers which flows through the photoconductor over a measurement period is zero, wherein the measurement period is defined by a time between two consecutive transitions of a bias voltage polarization in the same direction;

wherein the device comprises at least one first electronic circuit, wherein the first electronic circuit is configured for generating at least one first output signal, wherein a frequency of the first output signal is a mathematical function of said measurement period of the photoconductor;

wherein the device comprises at least one second photoconductor configured for exhibiting an electrical resistance $R_{photo2}$ dependent on an illumination of its light-sensitive region, wherein the device comprises at least one second electronic circuit configured for generating a second measurement period, wherein the second electronic circuit is configured for generating at least one second output signal, wherein a frequency of the second output signal is a mathematical function of the measurement periods of the photoconductor and of the second photoconductor; and wherein:
the second electronic circuit is a frequency mixer; or
the device comprises at least one third resistor for exhibiting an irradiation independent electrical resistance with the same temperature dependency as the photoconductor and the second photoconductor, wherein the third resistor is either a photoconductor, darkened in such a way that it experience no irradiation, or a non-photosensitive resistor, wherein the device comprises at least one third electronic circuit configured for generating a third frequency, wherein the third frequency serves as a reference frequency, wherein the reference frequency is used to generate a difference of the frequencies from the illuminated photoconductors by means of at least two electronic circuits.

2. The device according to claim 1, wherein the photoconductor readout circuit comprises:
at least one measurement voltage divider circuit, wherein the photoconductor is in series with at least one capacitor, wherein the capacitor is chargeable by the photoconductor;
at least one comparator circuit comprising at least one reference voltage divider circuit and at least one comparator, wherein the comparator comprises at least one input, wherein a first input is electrically connected with an output of the measurement voltage divider circuit, wherein the comparator is configured for changing between two output states when input voltage at the first input is identical with at least one reference voltage; and
at least one output terminal, wherein the electrical resistance $R_{photo}$ of the photoconductor is determinable from a charge-discharge-frequency at the output terminal.

3. The device according to claim 2, wherein the reference voltage divider circuit comprises at least two reference resistors each having a predefined or predetermined resistance.

4. The device according to claim 2, wherein the comparator is selected from the group consisting of: at least one operational amplifier; at least one Schmitt trigger; at least one logic elements based on emitter coupled logic (ECL); at least one transistor-transistor logic (TTL) such as at least one advanced Schottky (ASTTL), at least one FAST-Schottky, at least one High Speed CMOS and at least one CMOS; and at least one Tri-state logic comparator, wherein the comparator is configured for comparing the input voltage with at least one reference voltage and for generating an output signal indicating a result of the comparison.

5. The device according to claim 2, wherein a charge-discharge speed of the capacitor depends on the resistance $R_{photo}$.

6. The device according to claim 2, wherein the photoconductor readout circuit comprises at least one amplifier configured for amplifying an output signal of the comparator circuit.

7. The device according to claim 1, wherein the device comprises at least one coupling to at least one evaluation device.

8. The device according to claim 1, wherein the light-sensitive region comprises at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, and organic semiconductors.

9. The device according to claim 1, wherein the device comprises at least one temperature sensitive element, wherein a signal of the temperature sensitive element is used to correct the first output signal of the first electronic circuit.

10. A detector comprising at least one device according to claim 1, wherein the detector comprises at least one evaluation device configured for determining an output signal at least one output of the photoconductor readout circuit of the device, wherein the evaluation device is configured for determining an electrical resistance $R_{photo}$ of the photoconductor by evaluating the output signal.

11. The detector according to claim 10, wherein the evaluation device is configured for performing one or more operations selected from the group consisting of: at least one Fourier transformation; a counting of frequency, an edge detection, and a measurement of the period length.

12. A method of using a device according to claim 1 for a purpose of readout of at least one photoconductor, wherein the device comprises at least one photoconductor configured for exhibiting an electrical resistance $R_{photo}$ dependent on an illumination of a light-sensitive region of the photoconductor, at least one photoconductor readout circuit, wherein the photoconductor readout circuit is configured for determining the electrical resistance $R_{photo}$ of the photoconductor, wherein the photoconductor readout circuit comprises at least one bias voltage source configured for applying at least one modulated bias voltage to the photoconductor, wherein the photoconductor comprises one or more of at least one PbS sensor, at least one PbSe sensor, or at least one pixelated sensor array comprising a plurality of pixels, wherein each of the pixels comprises at least one PbS or PbSe sensor.

* * * * *